United States Patent
Hayes et al.

(10) Patent No.: US 6,772,411 B2
(45) Date of Patent: Aug. 3, 2004

(54) SOFTWARE PERFORMANCE AND MANAGEMENT SYSTEM

(75) Inventors: Scott R. Hayes, Spencerport, NY (US); Christopher J. Born, South Glastonbury, CT (US)

(73) Assignee: BMC Software, Inc., Houston, TX (US)

( * ) Notice: Subject to any disclaimer, the term of this patent is extended or adjusted under 35 U.S.C. 154(b) by 266 days.

(21) Appl. No.: 09/728,937

(22) Filed: Dec. 1, 2000

(65) Prior Publication Data

US 2002/0129035 A1 Sep. 12, 2002

(51) Int. Cl.[7] .................................................. G06F 9/44
(52) U.S. Cl. .................. 717/127; 717/124; 717/125; 717/130; 717/131; 707/2; 707/102; 714/12
(58) Field of Search ................................. 717/124, 125, 717/130, 131, 127; 707/2, 102, 186; 709/103; 714/26, 12

(56) References Cited

U.S. PATENT DOCUMENTS

| | | | |
|---|---|---|---|
| 4,509,119 A | | 4/1985 | Gumaer et al. |
| 4,845,710 A | | 7/1989 | Nakamura et al. |
| 5,093,912 A | | 3/1992 | Dong et al. |
| 5,412,781 A | | 5/1995 | Lukas et al. |
| 5,432,932 A | * | 7/1995 | Chen et al. ................. 709/103 |
| 5,440,692 A | | 8/1995 | Janicek |
| 5,450,586 A | * | 9/1995 | Kuzara et al. .............. 717/124 |
| 5,475,843 A | * | 12/1995 | Halviatti et al. ............ 717/124 |
| 5,483,468 A | * | 1/1996 | Chen et al. ................. 702/186 |
| 5,506,955 A | * | 4/1996 | Chen et al. .................. 714/26 |
| 5,680,573 A | * | 10/1997 | Rubin et al. ................ 711/129 |
| 5,784,698 A | | 7/1998 | Brady et al. |
| 5,812,996 A | * | 9/1998 | Rubin et al. .................. 707/2 |
| 5,954,829 A | * | 9/1999 | McLain, Jr. et al. ........ 714/712 |
| 6,044,477 A | | 3/2000 | Jordan et al. |
| 6,058,393 A | * | 5/2000 | Meier et al. .................. 707/10 |
| 6,324,683 B1 | * | 11/2001 | Fuh et al. .................... 717/124 |
| 6,493,699 B2 | * | 12/2002 | Colby et al. .................. 707/2 |
| 6,502,102 B1 | * | 12/2002 | Haswell et al. ............. 707/102 |
| 6,526,044 B1 | * | 2/2003 | Cookmeyer et al. ........ 370/352 |

OTHER PUBLICATIONS

Title: Continuous profiling: where have all the cycles gone?, author: Anderson et al, ACM, 1997.*
Title: Performance, preference, and visual scan patterns on a menu☐based system: implications for interface design, author: J. J. Hendrickson, ACM, 1989.*
Title: Selectively materializing data in mediators by analyzing user queries, author: Ashish, N.; Knoblock, C.A.; Shahabi, C.; IEEE, 1989.*

(List continued on next page.)

Primary Examiner—Chameli C. Das
(74) Attorney, Agent, or Firm—Wong, Cabello, Lutsch, Rutherford & Brucculeri, L.L.P.

(57) ABSTRACT

A system and method for monitoring resource usage in a software system such as a database system is described. The user selects an application to monitor through a user-interface. On selection, one or more first-level statement groups associated with the application are displayed and run-time data for at least one of the displayed first-level statement groups is displayed. Illustrative run-time data indicating resource usage include the amount of processor time used to execute a first-level statement group. The user may then select a first-level statement group so that at least one second-level statement group associated with the selected first-level statement group is displayed, including various run-time data. When the selected application is a database application, a user may review run-time information associated with the execution of database packages, sections and individual SQL statements, including dynamic SQL statements.

20 Claims, 11 Drawing Sheets

OTHER PUBLICATIONS

Title: High–Level language debugging for concurrent programs, author: Goldszmidt et al, ACM, 1990.*

Title: Reconciling System Requirement s and Runtime Behavior, author: Feather et al, ACM, Apr. 1998.*

"4.0 Chapter 4. Monitoring Your Database," Database System Monitor Guide and Reference, via IBM BookManager BookServer, http://publib.boulder.ibm.com, 1995, 1 page.

"4.1 Choosing Snapshot of Event Monitoring," Database System Monitor Guide and Reference, via IBM BookManager BookServer, http://publib.boulder.ibm.com, 1995, 1 page.

"4.2 Tuning Configuration Parameters," Database System Monitor Guide and Reference, via IBM BookManager BookServer, http://publib.boulder.ibm.com, 1995 2 pages.

"4.2.1 Buffer Pool Size (buffpage), "Database System Monitor Guide and Reference, via IBM BookManager BookServer, http://publib.boulder.ibm.com, 1995, 2 pages.

"NotesBench Disclosure Report for Lotus Notes on OS/2 Warp Server," Lotus Product Information Database, http://www.groupware.com.au/prodinfo/2736.htm, May 18, 1996, 21 pages.

Chiesa, Dino P., "Configuring Buffer Pool Size," TRANSARC©, http://www.transarc.com/library/whitepapers/tg/node51.html, Sep. 5. 1996, 2 pages.

Chiesa, Dino P., "vmstat Example, " TRANSARC©, http://www.transarc.com/library/whitepapers/tg/node51.html, Sep. 5, 1996, 3 pages.

Chiesa, Dino P., "iostat Example," TRANSARC©, http;//www.transarc.com/library/whitepapers/tg/node51.html, Sep. 5, 1996, 3 pages.

Chiesa, Dino P., "Vender Specific Performance Tools," TRANSARC©, http://www.transarc.com/library/whitepapers/tg/node51.html, Sep. 5, 1996, 1 page.

Chiesa, Dino P., "Summary,"TRANSARC©, http://www.transarc.com/library/whitepapers/tg/node51.html, Sep. 5, 1996, 2 pages.

Chiesa, Dino P., "SFS Startup Parameters," TRANSARC©, http://www.transarc.com/library/whitepapers/tg/node51.html, Sep. 5, 1996, 1 page.

* cited by examiner

| Application Name | Total CPU Used | Percent CPU Used | Total Sort Time | Percent Sort Time | Total Sorts | Total Elapsed Time | Count |
|---|---|---|---|---|---|---|---|
| db2expln | 146.64 | 98.89 | 288 | 100.00 | 2186 | 1012.94 | 6377 |
| Package Name | | | | | | | |
| SQLACB24 | 146.64 | 100.00 | 288 | 100.00 | 2186 | 1012.94 | 6377 |
| Section Number | | | | | | | |
| 10 | 99.63 | 67.94 | 0 | 0.00 | 0 | 332.64 | 988 |
| 11 | 43.14 | 29.42 | 288 | 100.00 | 2163 | 125.78 | 2163 |
| 3 | 1.58 | 1.08 | 0 | 0.00 | 0 | 533.04 | 48 |
| 6 | 1.24 | 0.85 | 0 | 0.00 | 0 | 17.27 | 1505 |
| 12 | 0.54 | 0.37 | 0 | 0.00 | 23 | 1.71 | 23 |
| 7 | 0.36 | 0.25 | 0 | 0.00 | 0 | 1.69 | 1553 |
| 4 | 0.07 | 0.05 | 0 | 0.00 | 0 | 0.49 | 49 |
| 5 | 0.07 | 0.05 | 0 | 0.00 | 0 | 0.30 | 48 |
| 8 | 0.01 | 0.01 | 0 | 0.00 | 0 | 0.02 | 0 |

Applications Displayed: All
Active Keys : [enter], [B/b], [E/e], [J/j], [M/m], [R/r], [S/s]
Agent Connection Status: [Connected]   DB2 Userid   :_db2instp
Agent Name/EM: SPEED                   DB2 Database:_proddb

FIG. 12

```
           SQL-GUY(TM) VERSION 2.10  (C) 2000 DATABASE-GUYS Inc.
  [F]ile         [E]vent Manager          [S]tatistics           [H]elp
                        SQL Statement Text
  SELECT CREATOR, NAME FROM SYSIBM.SYSTABLES WHERE FID = ? AND TID =
  ? ORDER BY CTIME

[ Save to File ]              [Ok]
  Applications Displayed: All
  Active Keys : [enter], [B/b], [E/e], [J/j], [M/m], [R/r], [S/s]
  Agent Connection Status: [Connected]      DB2 Userid   :_db2instp
  Agent Name/EM: SPEED                      DB2 Database:_proddb
```

*FIG. 13*

```
           SQL-GUY(TM) VERSION 2.10  (C) 2000 DATABASE-GUYS Inc.
  [F]ile         [E]vent Manager          [S]tatistics           [H]elp
                   |Total  |Percent|Total |Percent|Total |Total    |Count
  Application Name |CPU    |CPU    |Sort  |Sort   |Sorts |Elapsed  |
                   |Used   |Used   |Time  |Time   |      |Time     |
  db2expln          213.37   96.63   467  100.00   3190  1472.78    9296
  [d]csas             3.00    1.36     0    0.00      0    81.46    1538
  clcsas              2.88    1.30     0    0.00      0   105.45    2058
  clcsas              1.48    0.67     0    0.00      0    37.66    1029
  db2bp_s             0.07    0.03     0    0.00      0     0.12       8
  dgsqevma            0.00    0.00     0    0.00      0     0.00       1
  db2bp_s             0.00    0.00     0    0.00      0     0.00       0
  db2bp_s             0.00    0.00     0    0.00      0     0.00       0
  dgsqul              0.00    0.00     0    0.00      0     0.00       0

Applications Displayed: All
  Active Keys : [enter], [A/a], [B/b], [C/c], [E/e], [G/g], [J/j], [K/k], [M/m], [R/r], [S/s]
  Agent Connection Status: [Connected-Paused] DB2 Userid   :_db2instp
  Agent Name/EM: SPEED                        DB2 Database:_proddb
```

```
       SQL-GUY(TM) VERSION 2.10  (C) 2000 DATABASE-GUYS Inc.
 File          Event Manager              Statistics              Help
                       ─ SQL Explain Results ─
    EQUIV_CRS_ID23, EQUIV_SECTION_ID23, EQUIV_CRS_ID24,
    EQUIV_SECTION_ID24
  from SIS_COURSE_TEAM_TB
  where(((TEAM_CYT = :H00002 AND CRS_ID = :H00004 AND SECTION_ID >=
       :H00006) OR ( TEAM_CYT = :H00002 AND CRS_ID >= :H00004) OR
       ( TEAM_CYT > :H00002 ))) AND ( TEAM_CYT >= :H00002 )
  order by TEAM_CYT, CRS_ID, SECTION_ID
  optimize
  for 1 row
  Estimated Cost         = 7120
  Estimated Cardinality  = 5493
  □Access Table Name = PRODDBA.SIS_COURSE_TEAM_TB  id = 782

[ Save to File ]                       [ Ok ]

Applications Displayed: All
 Active Keys : [enter], [B/b], [E/e], [J/j], [M/m], [R/r], [S/s]
 Agent Connection Status: [Connected]        DB2 Userid    :_db2instp
 Agent Name/EM: SPEED                        DB2 Database:_proddb
```

*FIG. 19*

```
       SQL-GUY(TM) VERSION 2.10  (C) 2000 DATABASE-GUYS Inc.
 File          Event Manager              Statistics              Help
                  |Total  |Percent|Total |Per |Refresh Applications
 Application Name |CPU    |CPU    |Sort  |Sor |Choose ID Column
                  |Used   |Used   |Time  |Tim |Snapshot Switch Settings
 db2expln         |307.54 | 92.99 | 1140 | 10 |Display Options
 zbd2rts          | 10.57 |  3.20 |    0 |    |<Esc>Close Menu
 clcsas           |  4.14 |  1.25 |    0 |
 clcsas           |  4.12 |       ┌─ Select ID Column ─┐  0| 157.00| 2937
 clcsas           |  3.83 |       │ Application ID     │  0| 154.28| 2401
 clcsas           |  0.22 |       │ □Auth ID           │  0|   6.47|  182
 db2expln         |  0.15 |       │ Application Name   │  1|   0.63|   10
 db2bp_s          |  0.11 |       │ <Esc>Close Menu    │  0|   0.18|   12
 db2bp_s          |  0.03 |       └────────────────────┘  0|   0.03|    2
 dgsqevma         |  0.00 |  0.00 |    0 | 0.00|  0|   0.07|    3
 dgsqul           |  0.00 |  0.00 |    0 | 0.00|  0|   0.00|    0
 db2bp_s          |  0.00 |  0.00 |    0 | 0.00|  0|   0.00|    0

Applications Displayed: All
 Active Keys : [W/w], [J/j]
 Agent Connection Status: [Connected]        DB2 Userid    :_db2instp
 Agent Name/EM: SPEED                        DB2 Database:_proddb
```

SOFTWARE PERFORMANCE AND MANAGEMENT SYSTEM

BACKGROUND OF THE INVENTION

This invention is related in general to digital processing systems and more specifically to a system for monitoring and improving the performance of software such as a database system.

It is important, often vitally so, to improve the performance of software programs. This is particularly true in applications where large and complex software systems experience decreased execution speed, or other inefficiencies, due to lack of resources. Such resources are typically central processing unit (CPU) time, or cycles, and memory space, or other storage capacity.

For example, database systems need to provide fast, accurate, and efficient searching, presentation and other manipulation, of data in databases. An example of a popular database system is the "DB2" database engine. A common query language for a DB2 system is SQL. Such a system is a relational database that allows users to make queries of the database using relational operators such as AND, OR, NOT, etc. Different types of records can be defined and associated with other records. The records can be sorted, or otherwise processed, intermittently. Also, a DB2 system can be accessed by many simultaneous human users, or automated software processes, either in a parallel or timeshared fashion.

Many levels of complexity exist in database systems. Much of this complexity is due to the sheer size of the database, and to relationships between records and other data structures in the database. The time needed to execute a query, and return the desired results, is due to many factors that include the type of query, the design of the database, the allocation and type of resources, the number of users in a system, the design of the query engine, the design of the query; and other factors. For example, a system typically has a limited amount of random-access memory (RAM). Such memory is of a high-speed and should, ideally, be used to store items that are currently needed by the CPU, which will be needed in the near future, or which will be needed relatively often. However, allocating the right amount of RAM to a database system (e.g., in the form of "buffer pools") is a complex problem whose solution may change frequently as the processing conditions of the overall system change. Although the problem is complex, it is important to be able to resolve the problem since allocation of resources in the form of buffer pools can greatly improve the performance of a database system.

Another important factor in analyzing the performance of database systems is execution time. Software executing in a database system, such as DB2, can include many large applications. Each application, in turn, can include packages, sections and other organizations of SQL text, or statements. It is important for a database administrator to be able to detect which portions of SQL text are consuming an undue amount of resources, such as CPU time, as this might indicate an improperly, or inefficiently, programmed query or database task. There are other factors of importance to database performance such as determining when a task, or query, will end based on system costs, estimated cardinality and delta delivery rates of data.

Thus, it is desirable to provide an effective performance monitoring and management system.

SUMMARY OF THE INVENTION

The present invention allows precise determination of resource use within the database system. One embodiment of the invention allows a user to investigate resource usage by SQL statement. The invention is capable of efficiently identifying unique dynamic SQL statements (i.e., Equalized I.D.).

The invention provides a global view which efficiently presents to a user, or database administrator, resource costs irrespective of other often-provided misleading characteristics such as Connection, Program, AuthID, ApplID. The invention can provide predictions for when a query, or other database task, will end based on selectable parameters such as optimizer cost, estimated cardinality, and delta delivery rates of data. In a preferred embodiment, a user interface is provided whereby a user can create or select event monitors to acquire statistical data on a database task. The results of activating the event monitor are presented to the user such that the user can progressively examine portions of an application, package, section and even individual statements. The user interface allows a user to efficiently and precisely identify processing shortcomings so that the performance of a database task can be improved. The interface also allows a user to sort, or otherwise organize, the statistical data so that analysis of the data is improved.

In one embodiment, the invention provides a method for analyzing the performance of an application in a database system. The method includes steps of accepting first signals from the user input device to select the application; displaying at least a portion of the first-level statement groups; accepting second signals from the user input device to select a first-level statement group; displaying at least a portion of second-level statement groups associated with the first-level statement group; and displaying statistical data on statements within at least one of the second-level statement groups associated with the first-level statement group.

DESCRIPTION OF THE SPECIFIC EMBODIMENTS

Various aspects of the present invention are embodied in a suite of software analysis tools manufactured and distributed by Database-GUYS, Inc.

FIGS. 1 through 21 are discussed below to illustrate a sample session of a procedure whereby a database administrator can use features of the present invention to identify a "most costly" SQL statement, or portion of a dynamic SQL statement. "Cost" can be in terms of CPU cycles used, memory space used or reserved, or other allocation of computing resources.

Figure 1:
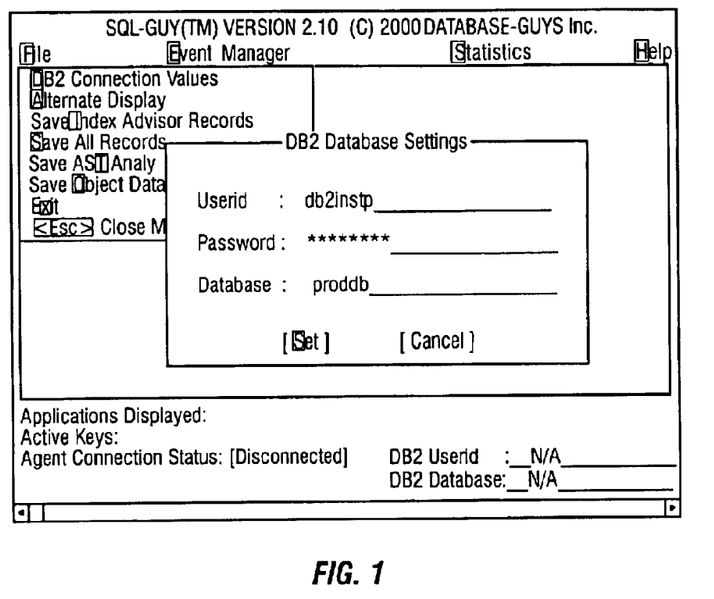
FIG. 1 is a first screen image of the user interface.

FIG. 1 shows a login screen for a product embodying the present invention called SQL-GUY™ manufactured and distributed by Database-GUYS, Inc. The login screen asks for user ID, password, and the database name against which the SQL statements and performance metrics will be scored.

Figure 2:
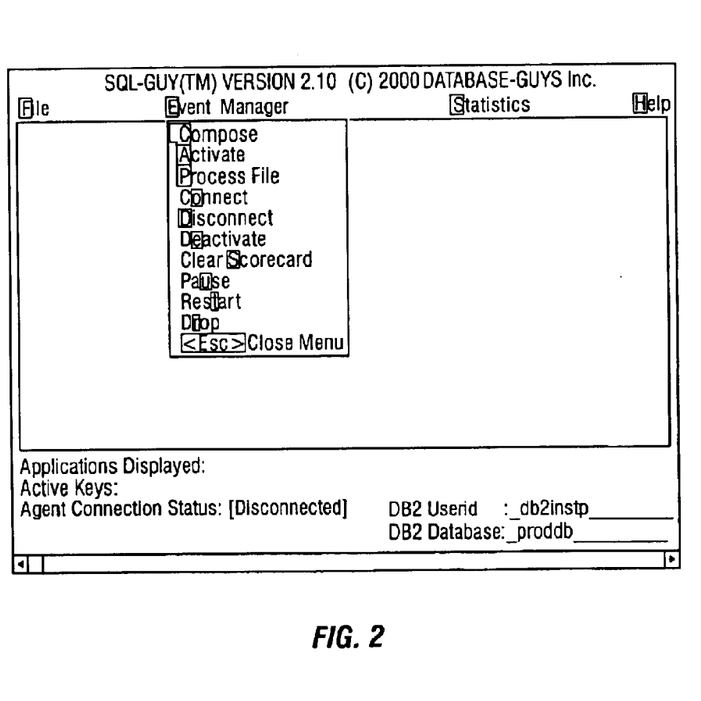
FIG. 2 is a second screen image of the user interface.

FIG. 2 illustrates a menu used to create a new event.

After logging in and selecting a database, the user can specify an event used to trigger "scoring" or detection and data gathering based on the event. The process of creating and controlling (e.g., starting, pausing, restarting, etc.) an event is controlled by the menu shown in FIG. 2 under "Event Manager."

Figure 3:
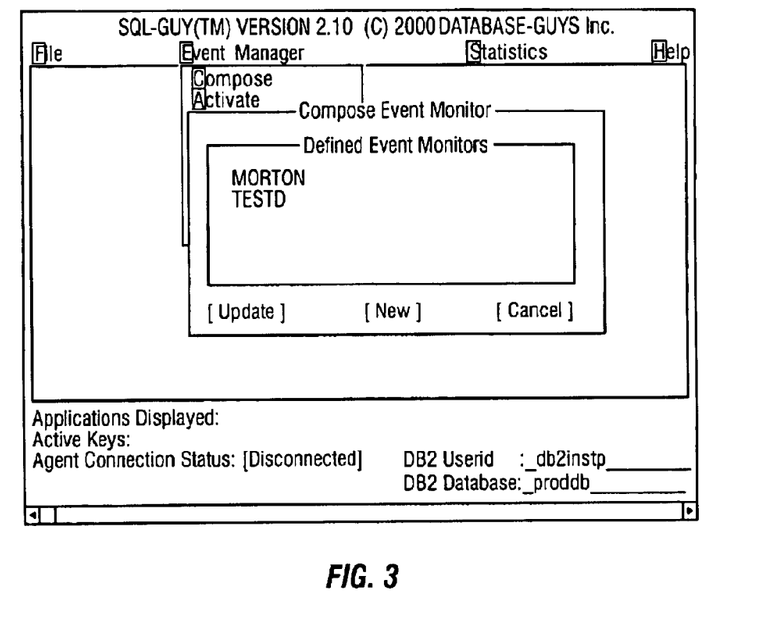
FIG. 3 is a third screen image of the user interface.

FIG. 3 shows additional pop-up menus illustrating that predefined event monitors can be used, or a new event monitor can be created.

Figure 4:
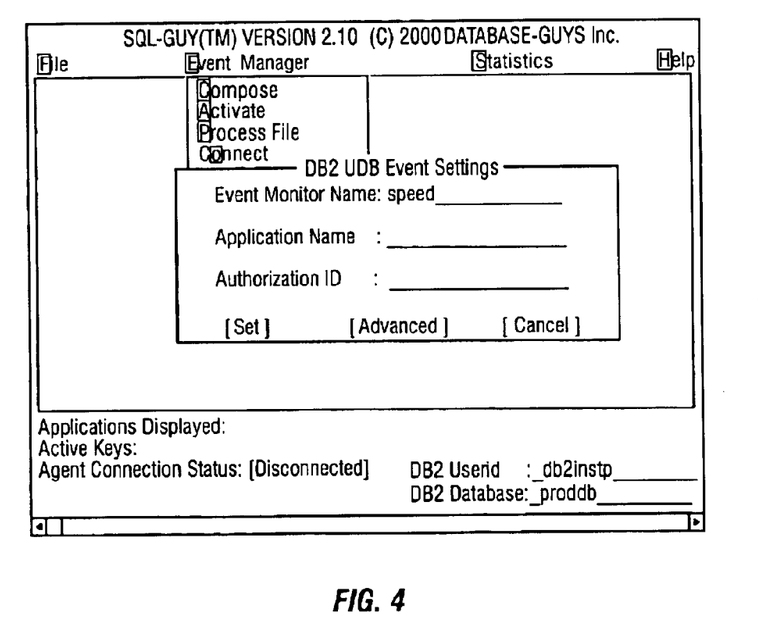
FIG. 4 is a fourth screen image of the user interface.

FIG. 4 shows the screen with an "Event Settings" dialog box in view. The user is able to name the event monitor, specify an application, and provide an authorization ID, if required. At a minimum, a name must be assigned to an event monitor. If an application name is provided, only SQL Costs for that application (e.g., "payroll") will be evaluated. If an authorization ID is provided, only SQL Costs for that authorization ID (e.g., "user22" or "bob") will be evaluated. If both application name and authorization ID are provided, then both conditions must be true for SQL Costs to be evaluated (e.g., User "bob" runs the "payroll" application).

By employing the application name and/or authorization ID filters, the focus, or scope, of the SQL Cost analysis is more efficient (DB2 only passes on qualified statements for scoring) and refined (SQL that is not of interest is not presented in the displays). The Set button causes the Event Monitor to be created. At the user's option, the Advanced button provides the user with additional options, such as the ability to schedule the capture and analysis of SQL. For example, the user can direct the system to capture and cost evaluate SQL executed between the hours of 2:00 AM and 4:00 AM. The event monitor name is called "speed." Which can be stored and recalled at a later time, as desired. The "speed" event can now be activated from the Event Manager menu.

Activating the "speed" event monitor instructs the monitor to begin gathering and scoring SQL cost data. Data is gathered according to any specified filters, application name or authorization ID, or scheduled hours.

Figure 5:
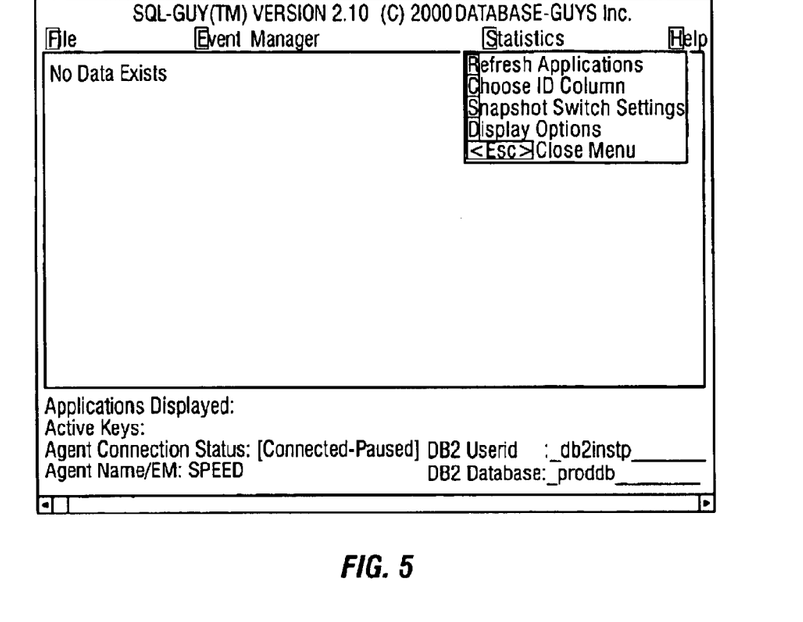
FIG. 5 is a fifth screen image of the user interface.

FIG. 5 illustrates the Statistics Menu which allows a user to view information gathered by an event monitor that has been activated. In FIG. 5, the user may choose to "Refresh Applications," "Choose ID Column," "Snap Shot Switch Settings," "Display Options," or "Close Menu."

Figure 6:
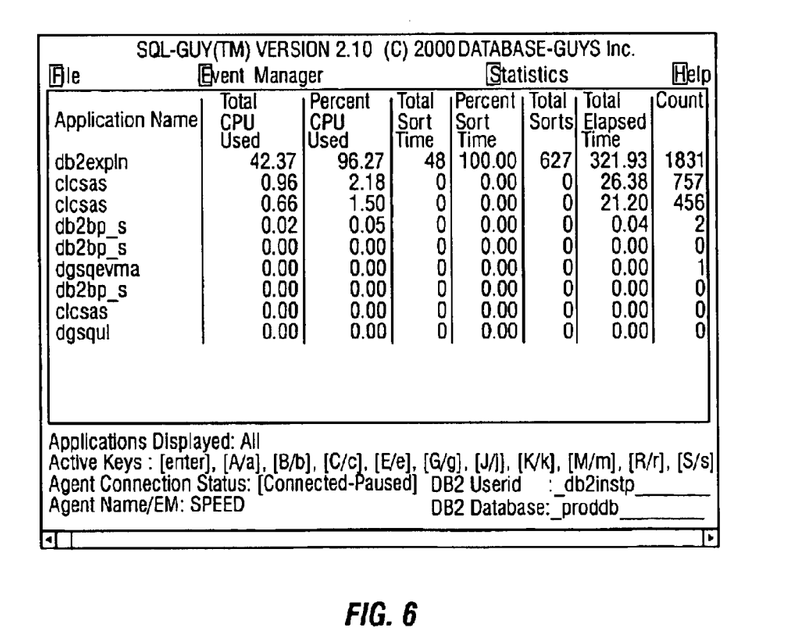
FIG. 6 is a sixth screen image of the user interface.

FIG. 6 shows the results when the user selects "Refresh Applications" from the Statistics Menu of FIG. 5. "Refresh Applications" causes the user interface to communicate with the SQL cost scoring mechanism. Current SQL cost scores are passed from the "scorekeeper" (background process) to the user interface, and sorted according to the criteria specified by "Display Options".

As shown in FIG. 6, CPU time is shown as both total time since the event monitor was activated (scoring started) and percent of CPU usage within a predefined interval. Additionally, total sort time for the database task whose name is listed in the first column is shown along with percent "sort time," "total sorts," "total elapsed time" and "count." The count shows the number of times that a uniquely identified statement has been executed. The user can select to investigate in more detail each of the applications. In a preferred embodiment, the user does this by depressing a key on the keyboard associated with each row in the display of FIG. 6. For example, "db2expln" is selected by depressing the "Enter" key on the keyboard.

Figure 7:
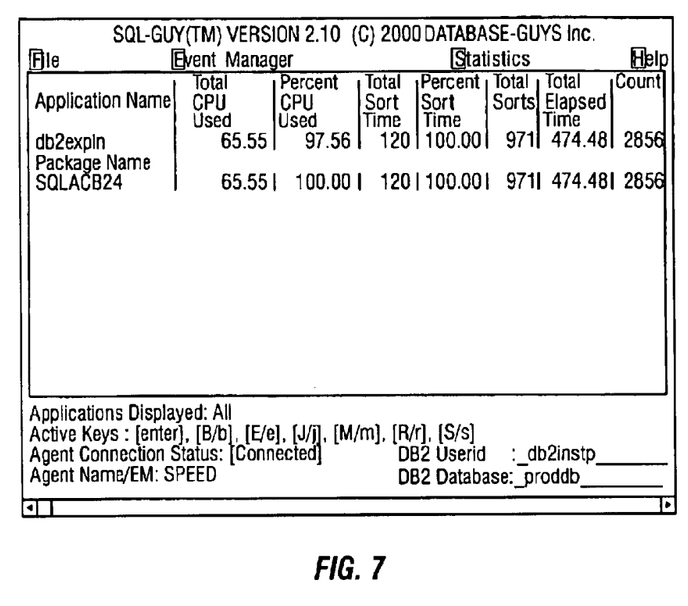
FIG. 7 is a seventh screen image of the user interface.

FIG. 7 shows a display after the user has selected db2expln from the screen of FIG. 6.

FIG. 7 shows the same statistics for application db2expln as shown in FIG. 6. Additionally, any packages within the application are shown along with each package's respective resource costs. For example, db2expln includes one package named SQLACB24 as shown in FIG. 7 along with statistics for the package. Note that the statistics are the same for the package as for the application since there is only one package within the application. An exception to this is percent of CPU time used since, for the package, it is percent of CPU time used with respect to CPU time used by the application.

Figure 8:
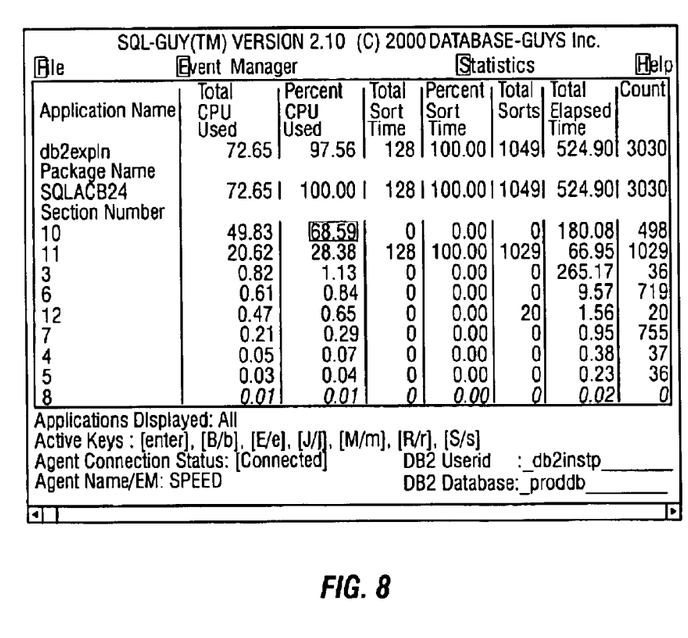
FIG. 8 is a eighth screen image of the user interface.

FIG. 8 shows a display after the user has selected package SQLACB24 of FIG. 7. Note that any manner of selecting items could be employed, such as a mouse and pointer pointing device, touch screen, etc.

In FIG. 8 illustrates sections within the package SQLACB24. Note that statistics are shown for each section number. In this manner, the user can determine which sections within the package are using the most resources. To assist the user the sections are listed in their order of highest percentage of CPU time used with respect to execution of the package. The user can determine that section 10 is using almost 70 percent of the total package CPU time. The user can obtain additional statistical details on the section number.

Figure 9:
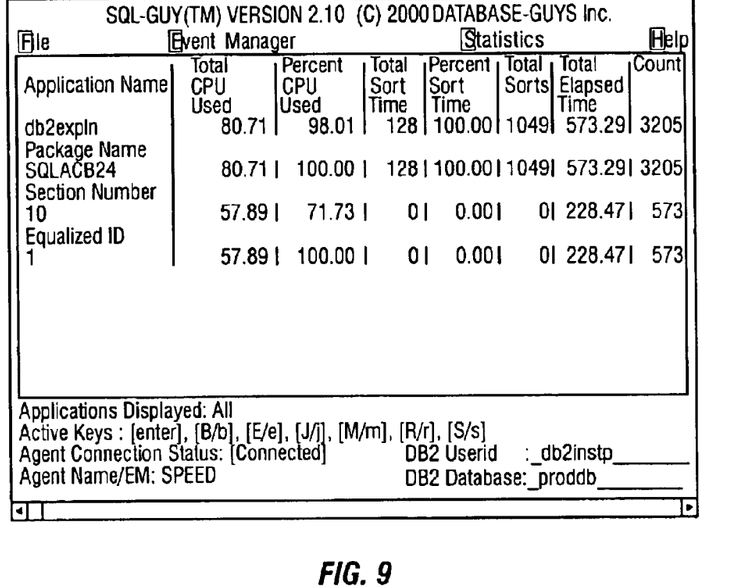
FIG. 9 is a ninth screen image of the user interface.

FIG. 9 illustrates the display after the user has selected section 10 for more details.

FIG. 9 shows that only one distinct SQL statement has been executed by section 10. This SQL statement is identified by "Equalized ID." Note that the statistics for the single statement are shown with respect to the resources used within section 10. Next, the user can select to display the SQL text of the highest CPU cost statement in the db2expln application.

Figure 10:
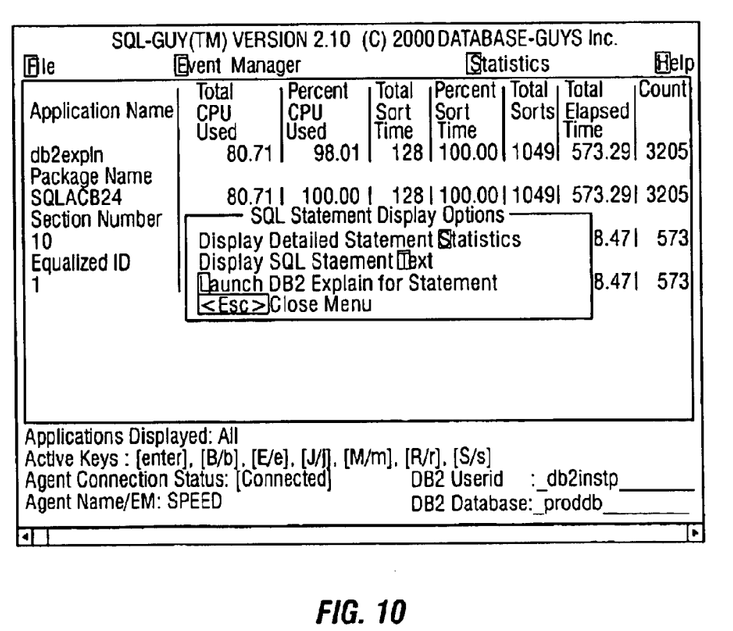
FIG. 10 is a tenth screen image of the user interface.
Figure 11:
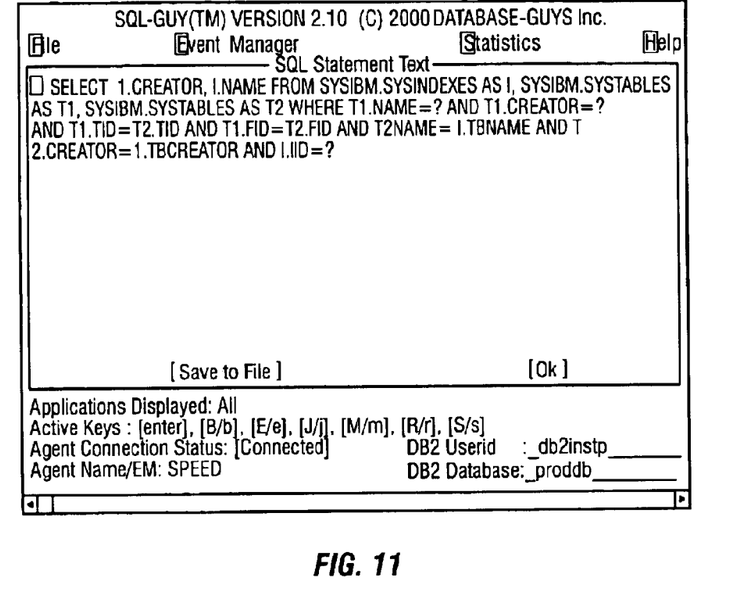
FIG. 11 is a eleventh screen image of the user interface.

FIG. 10 illustrates a pop-up menu box that allows a user to select SQL statement display options. For example, the user can select to "Display SQL Statement Text." The results of selecting this option are shown in FIG. 11. Alternatively, the user may also choose to display all of the detailed performance metrics related to a given unique statement, or invoke the DB2 Explain tool for the unique statement, or invoke the DB2 Index Advisor tool for the statement.

FIG. 12 again returns to a display similar to FIG. 8 where section numbers and their statistics are shown. Note that statistics differ between FIGS. 8 and 12 because the statistics are continuously updated in real time.

Figure 12:
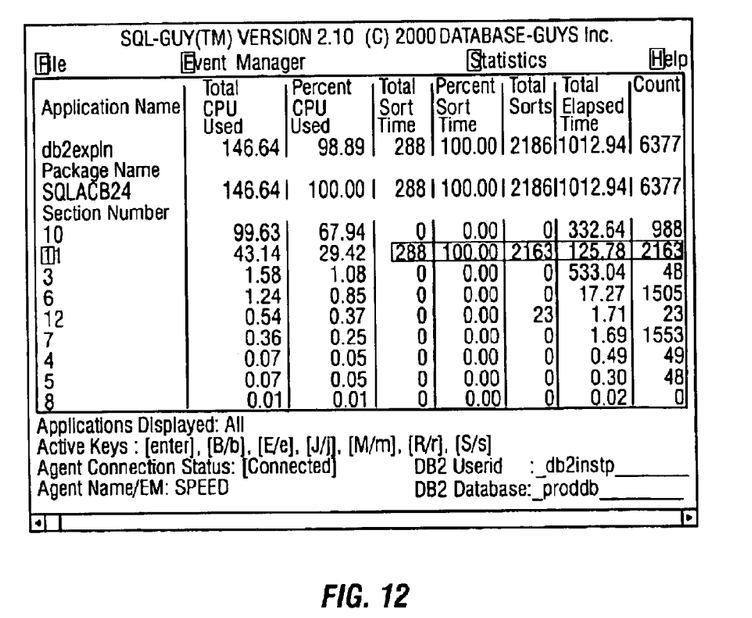
FIG. 12 is a twelfth screen image of the user interface.
Figure 13:
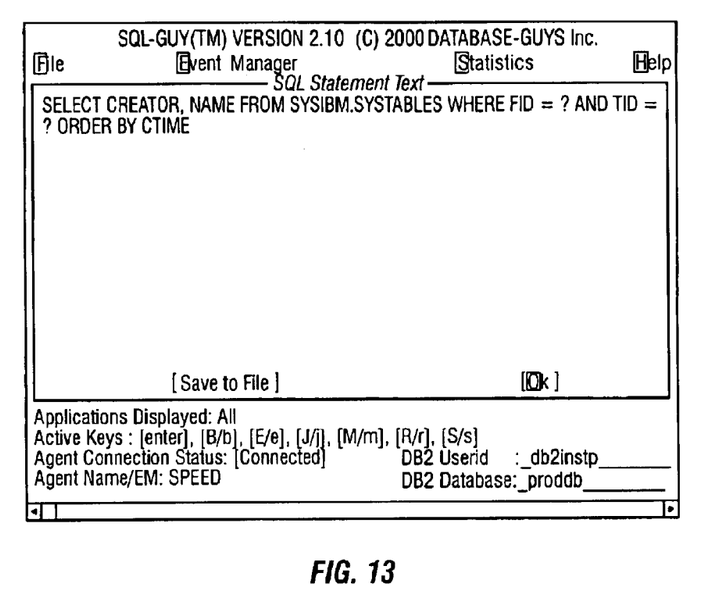
FIG. 13 is a thirteenth screen image of the user interface.
Figure 14:
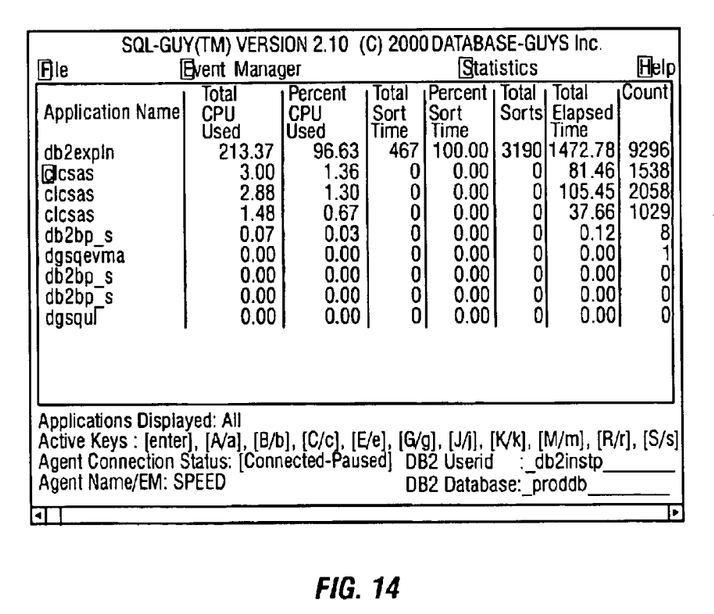
FIG. 14 is a fourteenth screen image of the user interface.

In FIG. 12, section 11 can be seen to be using 100 percent of the sort time for package SQLACB24. In a manner similar to that discussed above for section 10, the SQL text for section 11 can be displayed as shown in FIG. 13. FIG. 13 shows that SQL text for section 11 includes an "ORDER BY CTIME." clause. This is a CICS/6000. Since this is a CICS/6000 instruction the user would next return to the list of all applications as discussed in connection with FIG. 6. Such a list is shown in FIG. 14. Applications can execute several different packages. In FIG. 6, application "db2expln" executes package SQLACB24. In FIG. 14, application "cicsas" executes several packages.

Figure 15:
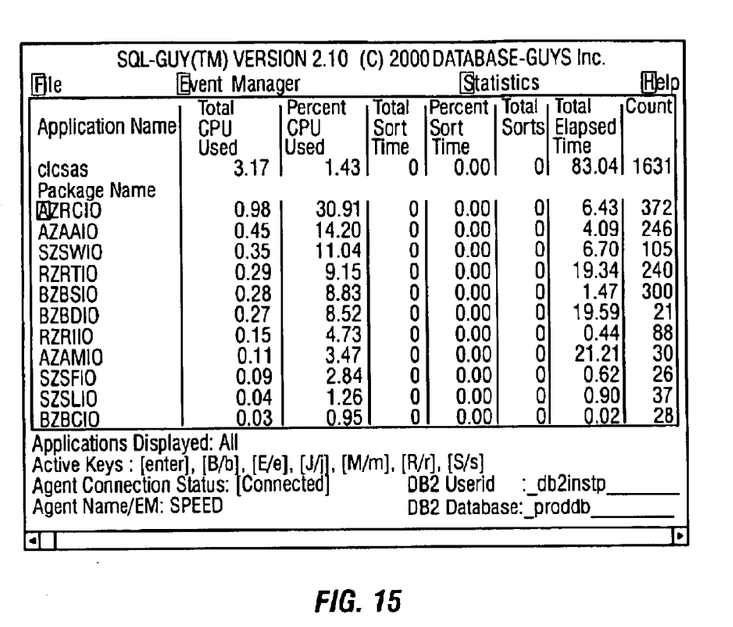
FIG. 15 is a fifteenth screen image of the user interface.

To obtain statistics on the cicsas application, the display of FIG. 15 is invoked to show that CICS is running several packages. The package named RZRCIO is using 30.91 percent of the CPU. This is more than twice that of the next-greater CPU use for a package.

Figure 16:
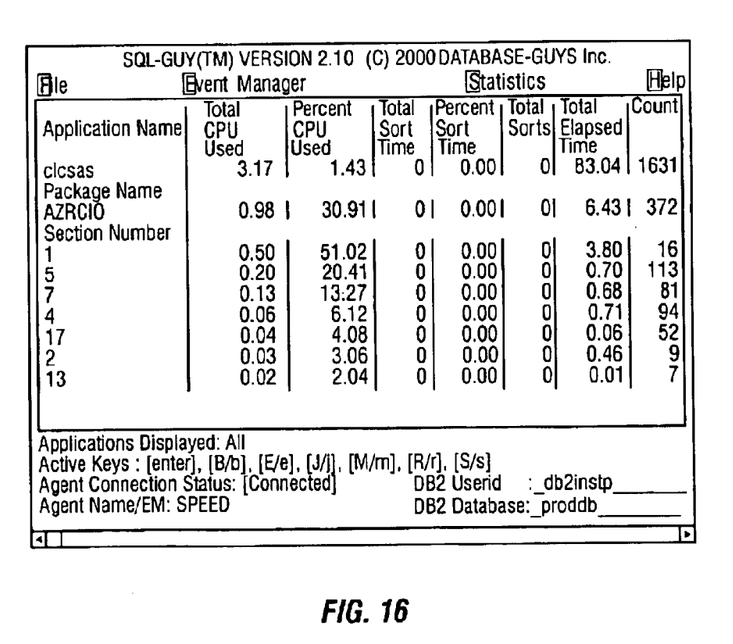
FIG. 16 is a sixteenth screen image of the user interface.
Figure 17:
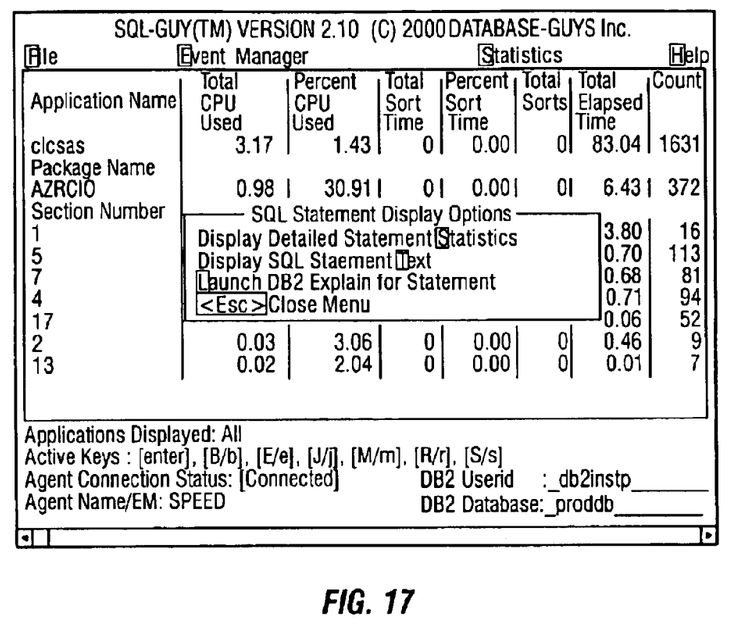
FIG. 17 is a seventeenth screen image of the user interface.
Figure 18:
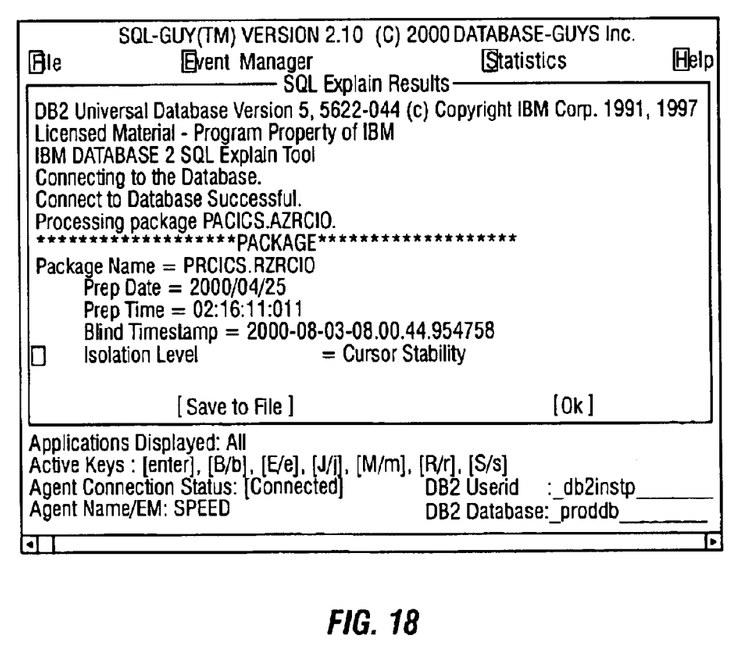
FIG. 18 is a eighteenth screen image of the user interface.

FIG. 16 is invoked by expanding on package RZRCIO to show that seven different sections are executed for this package. Note that section 1 is using over 50 percent of the package's CPU time. Using the commonly-known DB2 "Explain Facility" as selected by dialog box shown in FIG. 17, the SQL statement is expanded as shown in FIG. 18.

Figure 19:
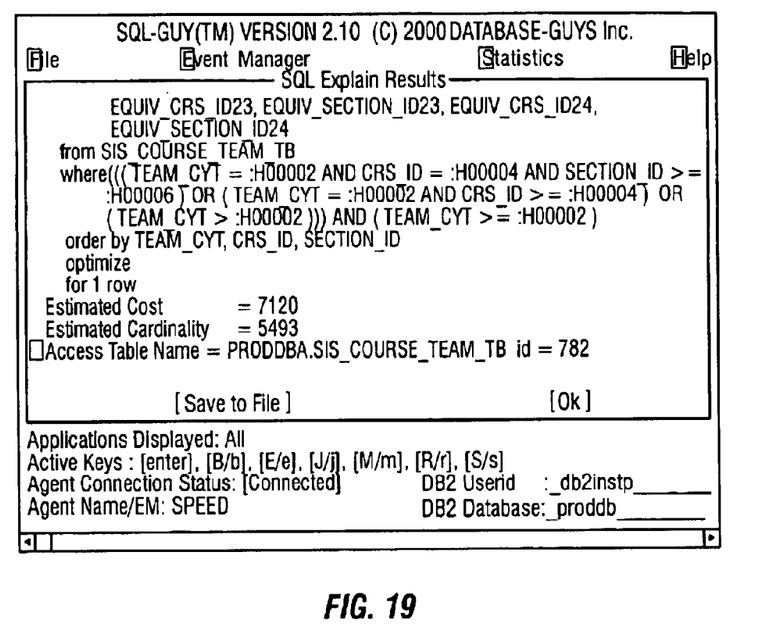
FIG. 19 is a nineteenth screen image of the user interface.

FIG. 19 shows a second screen of the DB2 explain utility output. Note that this utility shows the costs and cardinality estimates for executing the identified SQL statement. Several pages of display may actually be available depending on the complexity of DB2's execution plan.

Figure 20:
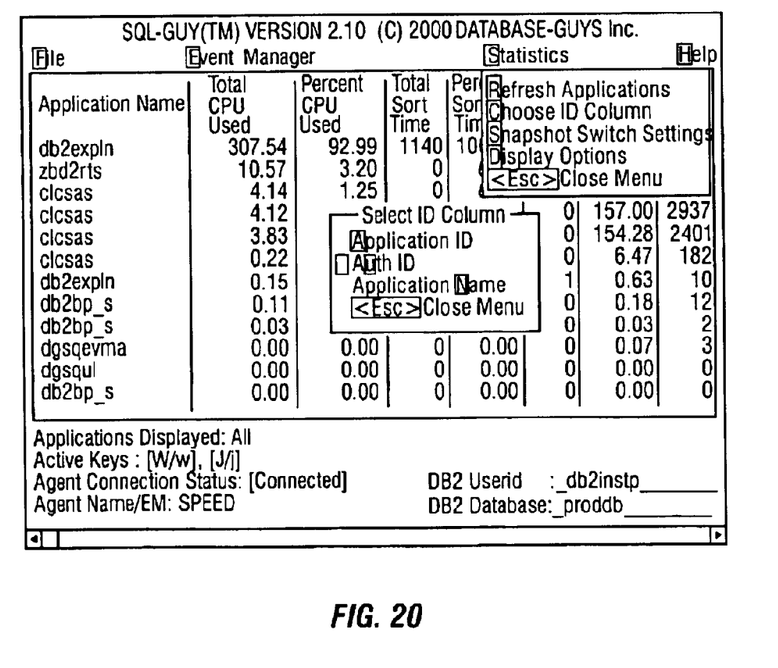
FIG. 20 is a twentieth screen image of the user interface.

FIG. 20 demonstrates the ability to change ID columns from "Program" to "Authid," or "Application ID." This allows a user to key the display to different IDs. Application ID is a unique identifier assigned by the database to each and every connection that requests SQL services. "Program" is a shorter name for "application name" as shown in FIG. 4. "Authid" is an abbreviation for Authorization ID, also shown in FIG. 4. The ability to choose the Identifying column enables the user to quickly locate SQL costs that may be of interest.

Figure 21:
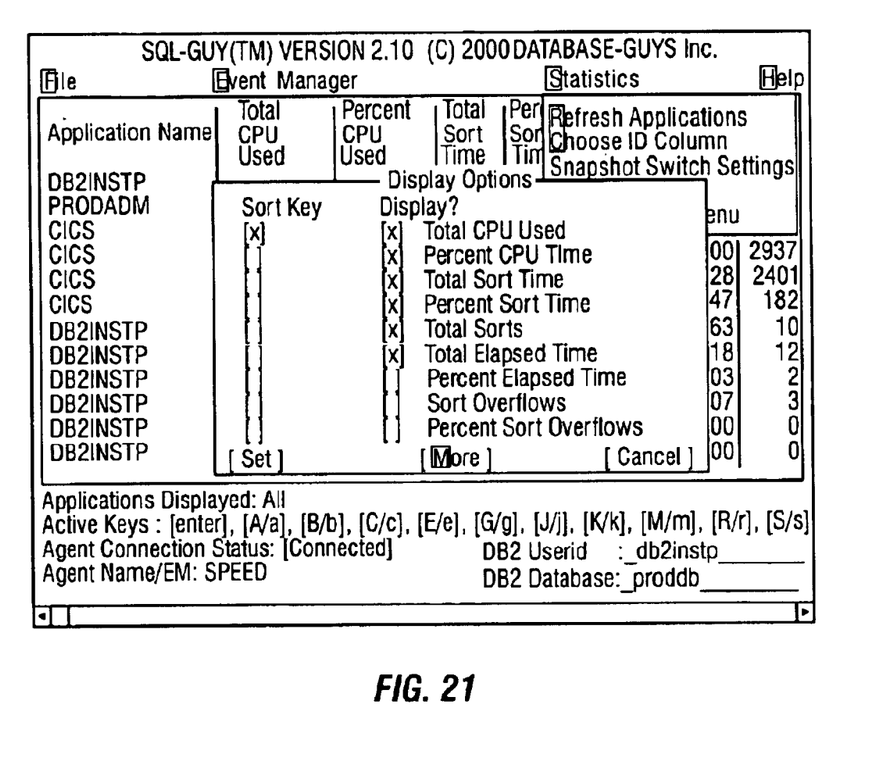
FIG. 21 is a twenty first screen image of the user interface.

The dialogue box in FIG. 21 demonstrates the ability to change display columns and sort criteria. For example, if the statements, section, package or application is CPU-bound then "sort on CPU" can be selected. Similarly, if sort-bound then sort can be on "sort metrics"; if physical I/O-bound then a sort can be on rows Read/Written.

A preferred embodiment of the invention parses dynamic SQL statements to find unique SQL Statements from an input stream of unidentified SQL Statements. Once a unique statement is identified, it can be monitored with an event monitor, as described above. Identifying the unique SQL Statements is accomplished by first breaking each statement down into statement portions, or "tokens." Tokens are the basic syntactical units of the SQL language. A token can be a sequence of one or more characters. A token cannot contain blank characters, unless the token is a string constant or delimited identifier, which may contain blanks.

The parsing and monitoring code uses a ParseTree data structure where components of SQL statements are nodes in a tree. The ParseTree is an N-ary tree allowing for N children of any given node. The code parses the tree (e.g., in depth-first) order until an end-of-statement indicator is reached. Once the end of the statement is reached, the statement is said to be "equalized" and the ChildNode currently being visited represents the EqualizedStatement Node for the statement.

Tables I through III illustrate pseudo-code for routines to implement the parsing and equalization processes. Table III represents the top-level code of a main loop. As SQL statements are analyzed, the dynamic SQL statements invoke a call to EqualizeStatement of Table II.

In EqualizeStatement, Global Application List, AL, is first initialized to NULL. Each entry of AL list contains a list of Packages, PKGS, which is initialized to NULL: Each entry of PKGS list contains a list of Section Numbers, SN, which is initialized to NULL. If the Statement type is Static, the Section Number uniquely identifies the Statement. If the Statement type is Dynamic, different statements (syntactically) may share the same Section Number. Dynamic Sequel Equalization is used to identify each unique statement under the same Section Number. Each Section Number that has one or more dynamic sequel statements has a EqualizedID count which is initialized to 1 and a ParseTree which is initialized to NULL which represents the dynamic statements that have already been processed for this section number.

Function ProcessToken is called. ProcessToken recursively calls ProcessToken to parse the tree to find an end-of-statement for the Current Node as the EqualizedStatementNode. The Equalized Statement Node represents the end of the statement within the parse tree. Once the end of the statement is reached then the statement has been uniquely identified.

TABLE I

Function ProcessToken (Arguments: Token from Statement, remainder of Statement, CurrentNode in ParseTree) returns EqualizedStatementNode
At CurrentNode in ParseTree, is there a ChildNode (with Token) that matches this Token?
    Yes:  Update "visit" count for ChildNode.
    No:  We have not seen this Token for CurrentNode yet, add a ChildNode for the CurrentNode which contains this Token. Set "visitcount" for new ChildNode to 1
CurrentNode is set to ChildNode.
Get nextToken T from S
Is T End of Statement?
    Yes:  We are finished with processing Statement, the CurrentNode represents the "end of the statement" or EqualizedStatementNode.
    Is visit count 1?
        Yes:  assign a unique Equalized ID for it - CurrentNode.StatementEqualizedID = GlobalEqualized ID.
            Increment GlobalEqualizedID.
            return CurrentNode;
        No:  We've seen this statement before, no need to assign a new Equalized ID.
            return CurrentNode;
    No:  return ProcessToken(T, Remainder of S, CurrentNode);
        /* Comment: We are calling ProcessToken recursively, while traversing "down" into the ParseTree. Once we reach the end of the statement, the recursive calls will return the EqualizedStatementNode to the main program */
end ProcessToken

TABLE II

Funcation EqualizeStatement(Args: SectionNumberStructure, ParseTree PTm and Statement S)
Begin EqualizeStatement
EqualizedStatementNode ESN = NULL;
Get first Token T from S
ESN = ProcessToken(T, Remainder of S, PT); /* Comment: At this point, ESN points to a node within ParseTree which represents last token processed for statement, ESN contains fields which hold statement metric information such as CPU usage, Elapsed time, etc. for statement. */
Update ESN metric information
end while
end EqualizeStatement

TABLE III

Begin Main
read first "unknown" Statement S from input
while more "unknown" Statements exist
    Locate Section Number SN for the statement from the corresponding AL lists
    Is the statement Dynamic?
        Yes:  EqualizeStatement(SN, S, PT);
        No:  Statement is static, just update the performance metrics for the SectionNumber SN.
    read next statement S from input
end while
end main Although the present invention has been discussed with respect to specific embodiments, these embodiments are merely illustrative, and not restrictive, of the invention. For example, although the invention has been discussed with respect to a database software system, various aspects of the invention may be applied to the analysis of other software applications. Further, software, firmware and even hardware performance is susceptible for analysis using the invention. The user interface can be implemented in a variety of ways and on various platforms. For example, the user interface can present the statistical data graphically using bar charts, pie charts, graphs, etc. as opposed to tabulated data.

Although the invention has been discussed with respect to applications, packages, sections and statements; any software system that uses a hierarchy of instructions or statements can be analyzed with many of the techniques and other aspects presented here. The software system can be generalized to levels of groups of statements. For example, a package is a first-level group of statements, a section is a second-level group of statements, and so on. Any number of levels are possible.

Thus, the scope of the invention is to be determined solely by the appended claims.

What is claimed is:

1. A method for analyzing the performance of an application in a database system, wherein the application includes statements for execution by a processor in the database system, wherein the statements are organized in a hierarchy of successive levels of statement groups within the application, wherein the application includes first-level statement groups associated with the application and second-level statement groups each associated with a first-level statement group and the application, the method executed by a processor coupled to a display and user input device, the method comprising:

accepting first signals from the user input device to select the application;

displaying at least a portion of the first-level statement groups;

accepting second signals from the user input device to select a first-level statement group;

displaying at least a portion of second-level statement groups associated with the first-level statement group; and displaying run-time statistical data on statements within at least one of the second-level statement groups associated with the first-level statement group.

2. The method of claim 1, wherein the database system is a DB2-compatible system, wherein first-level statements groups are packages, wherein second-level statement groups are sections.

3. The method of claim 2, wherein DB2 Explain is used to provide execution plan information on individual statements.

4. The method of claim 1, further comprising displaying run-time statistical information in association with one or more of the application, first-level or second-level statement groups.

5. A method for monitoring a database application, comprising:

selecting a database application;

displaying at least one first-level statement group associated with the selected database application;

selecting at least one of the displayed first-level statement groups;

displaying at least one second-level statement group associated with the selected first-level statement group, the displayed second-level statement group comprising one or more statements; and displaying execution-time data for at least one of the one or more statements.

6. The method of claim 5, wherein the act of selecting a database application further comprises using a user-specified filter to restrict the displayed first-level statement groups.

7. The method of claim 6, wherein the user-specified filter comprises a user authorization identifier.

8. The method of claim 5, wherein the act of displaying at least one first-level statement group further comprises displaying execution-time data for at least one of the displayed first-level statement groups.

9. The method of claim 8, wherein the act of displaying execution-time data for at least one of the displayed first-level statement groups comprises, displaying processor time associated with execution of the at least one displayed first-level statement groups.

10. The method of claim 5, wherein the act of displaying execution-time data for at least one of the one or more statements comprises, displaying computing resources used in executing at least one of the displayed statements.

11. The method of claim 10, wherein the displayed computing resources comprise the number of central processing unit cycles used to execute at least one of the displayed statements.

12. The method of claim 10, wherein the displayed computing resources comprise the number of times at least one of the displayed statements was executed.

13. The method of claim 5, wherein the ad of displaying execution-time data for at least one of the one or more statements further comprises, displaying the text of the command.

14. The method of claim 5, wherein the act of displaying execution-time data is performed in real-time.

15. The method of claim 5, wherein a first-level statement group comprises a database application package.

16. The method of claim 15, wherein a second-level statement group comprises a database application section.

17. The method of claim 16, wherein a statement comprises a Structured Query Language statement.

18. The method of claim 17, wherein the Structured Query Language statement comprises a dynamic Structured Query Language command.

19. A program storage device, readable by a programmable control device, comprising instructions stored thereon for causing the programmable control device to:

select a database application;

display at least one first-level statement group associated with the selected database application;

select at least one of the displayed first-level statement groups;

display at least one second-level statement group associated with the selected first-level statement group, the displayed second-level statement group comprising one or more statements; and display execution-time data for at least one of the one or more statements.

20. The program storage device of claim 19, wherein the instructions to display at least one first-level statement group further comprise instructions to display execution-time data for at least one of the displayed first-level statement groups.

* * * * *